United States Patent
Chang et al.

(10) Patent No.: US 10,561,981 B2
(45) Date of Patent: Feb. 18, 2020

(54) WET DESULFURIZATION APPARATUS CAPABLE OF IMPROVING DESULFURIZATION EFFICIENCY AND WET DESULFURIZATION METHOD USING THE SAME

(71) Applicant: DOOSAN HEAVY INDUSTRIES & CONSTRUCTION CO., LTD., Changwon-si, Gyeongsangnam-do (KR)

(72) Inventors: In Gab Chang, Yongin-si (KR); Min Su Paek, Yongin-si (KR); Jeong Seok Yoo, Yongin-si (KR); Joon Ho Kim, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/223,045

(22) Filed: Dec. 17, 2018

(65) Prior Publication Data

US 2019/0184336 A1    Jun. 20, 2019

(30) Foreign Application Priority Data

Dec. 19, 2017   (KR) .................. 10-2017-0174930

(51) Int. Cl.
   *B01D 53/26*    (2006.01)
   *B01D 53/34*    (2006.01)
   (Continued)

(52) U.S. Cl.
   CPC ........... *B01D 53/504* (2013.01); *B01D 53/26* (2013.01); *B01D 53/346* (2013.01);
   (Continued)

(58) Field of Classification Search
   CPC ............ B01D 53/1481; B01D 53/1406; B01D 53/50; B01D 53/501; B01D 53/504;
   (Continued)

(56) References Cited

U.S. PATENT DOCUMENTS 3,995,006 A * 11/1976 Downs ................. B01D 53/501
                                                  423/243.08
4,213,945 A *  7/1980 Haese .................... B01D 53/68
                                                  423/240 R
(Continued)

FOREIGN PATENT DOCUMENTS

CN    2014104582162   † 12/2014
JP    H06285326 A    10/1994
(Continued)

OTHER PUBLICATIONS

A Korean Office Action dated Jan. 29, 2019 in connection with Korean Patent Application No. 10-2017-0174930 which corresponds to the above-referenced U.S. application.
(Continued)

*Primary Examiner* — Timothy C Vanoy
(74) *Attorney, Agent, or Firm* — Invenstone Patent, LLC

(57) ABSTRACT

A wet desulfurization apparatus includes a chamber enclosing a space for passing flue gas and including a first barrier partitioning the space into first and second chamber regions, a flue gas inlet to introduce raw flue gas into the first chamber region, and a flue gas outlet to discharge desulfurized flue gas from the second chamber region; a second barrier partitioning a slurry reservoir into a first reservoir part to store a first pH alkaline slurry and a second reservoir part to store a second pH alkaline slurry; a first sprayer to spray the alkaline slurry from the first reservoir part into the first chamber region to remove sulfur from the flue gas in the first chamber region; and a second sprayer to spray the alkaline slurry from the second reservoir part into the second chamber region to remove sulfur from the flue gas in the second chamber region.

20 Claims, 5 Drawing Sheets

(51) Int. Cl.
  *B01D 53/50* (2006.01)
  *B01D 53/80* (2006.01)
(52) U.S. Cl.
  CPC ........... *B01D 53/505* (2013.01); *B01D 53/80* (2013.01); *B01D 2251/404* (2013.01); *B01D 2251/606* (2013.01); *B01D 2257/302* (2013.01); *B01D 2257/80* (2013.01)
(58) Field of Classification Search
  CPC ........ B01D 53/75; B01D 53/78; B01D 53/80; B01D 2257/302; B01D 2258/0283; B01J 10/00; B01J 19/00; B01J 19/0053; B01J 19/24
  See application file for complete search history.

(56) References Cited

U.S. PATENT DOCUMENTS

| | | | | |
|---|---|---|---|---|
| 5,246,678 | A | * | 9/1993 | Ochi ................... B01D 53/501 423/243.08 |
| 9,040,005 | B2 | * | 5/2015 | Hansen ................. B01D 47/00 423/212 |
| 2006/0185517 | A1 | * | 8/2006 | Nagel ................ B01D 53/1406 96/275 |
| 2012/0085240 | A1 | * | 4/2012 | Pelkman .............. B01D 53/504 96/355 |
| 2012/0285326 | A1 | * | 11/2012 | Ito ........................ B01D 53/504 96/111 |
| 2015/0238897 | A1 | * | 8/2015 | Molgaard ............. B01D 53/78 423/212 |
| 2015/0247637 | A1 | * | 9/2015 | Pelkman .................. F23J 15/04 261/109 |

FOREIGN PATENT DOCUMENTS

| | | |
|---|---|---|
| JP | 2002-273160 A | 9/2002 |
| JP | 2014-200768 A | 10/2014 |
| KR | 10-0906805 B1 | 7/2009 |
| KR | 10-1287345 B1 | 7/2013 |
| KR | 10-1646058 B1 | 8/2016 |
| KR | 10-1774774 B1 | 9/2017 |
| KR | 10-1782786 B1 | 10/2017 |
| WO | WO 9917862 A1 * | 4/1999 ......... B01D 53/1406 |

OTHER PUBLICATIONS

A Korean Office Action dated Aug. 26, 2019 in connection with Korean Patent Application No. 10-2017-0174930.

\* cited by examiner
† cited by third party

WET DESULFURIZATION APPARATUS CAPABLE OF IMPROVING DESULFURIZATION EFFICIENCY AND WET DESULFURIZATION METHOD USING THE SAME

CROSS REFERENCE TO RELATED APPLICATIONS

The present application claims priority to Korean Patent Application No. 10-2017-0174930, filed Dec. 19, 2017, the entire content of which is incorporated herein for all purposes by this reference.

BACKGROUND OF THE DISCLOSURE

1. Field of the Disclosure

The present invention relates to a wet desulfurization apparatus capable of improving desulfurization efficiency and a wet desulfurization method using the same. More particularly, the present invention relates to a wet desulfurization apparatus, in which the inside of the desulfurization apparatus is partitioned into two regions and desulfurization is carried out using alkaline slurries having different pH values, thereby improving desulfurization efficiency, and to a wet desulfurization method using the same.

2. Description of the Background Art

A wet desulfurization apparatus using limestone ($CaCO_3$) is mainly utilized in the treatment of sulfur oxide ($SO_x$) and acid gas contained in flue gas. Limestone is an alkaline material that is abundant in Korea and is widely applied in desulfurization, because it is relatively inexpensive compared to alternatives such as caustic soda (NaOH). Thus, large facilities tend to use wet desulfurization apparatuses, which, while somewhat high in initial investment costs, are advantageous in that operating and maintenance costs are low.

In a contemporary wet desulfurization apparatus, alkaline slurry is recycled and re-sprayed. Untreated gas is introduced to the desulfurization apparatus, after which acid gas is absorbed through gas-liquid contact in the chamber, and the absorbed acid gas is treated in the following reaction sequences using the alkaline slurry.

$$SO_2(g)+H_2O \rightarrow H_2SO_3(aq) \quad (1)$$

$$H_2SO_3(aq) \leftrightarrow H^+ + HSO_3^- \leftrightarrow 2H^+ + SO_3^{2-} \quad (2)$$

$$Ca^{2+}+SO_3^{2-} \leftrightarrow CaSO_3 \quad (3)$$

Here, sulfur oxide ($SO_x$) absorbed by the alkaline slurry is produced again into gypsum ($CaSO_4 \cdot 2H_2O$) through the following process steps.

$$O_2(g) \rightarrow O_2(aq) \quad (4)$$

$$HSO_3^- + \tfrac{1}{2}O_2 \rightarrow H^+ + SO_4^{2-} \quad (5)$$

$$SO_4^{2-} + \tfrac{1}{2}O_2 \rightarrow SO_4^{2-} \quad (6)$$

$$CaCO_3(s) + 2H^+ \rightarrow Ca^{2+} + H_2O + CO_2 \quad (7)$$

$$Ca^{2+} + SO_3^{2-} + \tfrac{1}{2}H_2O \rightarrow CaCO_3 \cdot \tfrac{1}{2}H_2O(s) \quad (8)$$

$$Ca^{2+} + SO_4^{2-} + 2H_2O \rightarrow CaSO_4 \cdot 2H_2O(s) \quad (9)$$

Meanwhile, there is a difference between the pH concentration for removing sulfur oxide from the flue gas and the pH concentration for increasing the gypsum purity. It is known that, typically, when the pH of the slurry in the wet desulfurization apparatus falls in the range of 4.0 to 5.0, the quality of gypsum is improved but the $SO_2$ absorption rate is decreased, and when the pH is maintained at 5.0 or more, the $SO_2$ absorption rate improves but the quality of gypsum deteriorates.

Accordingly, the contemporary wet desulfurization apparatus operates by stirring the slurry using an agitator and circulating the stirred slurry and thus is a system operating at a single (i.e., same) pH value. Therefore, the pH conditions for increasing the absorption rate of sulfur oxide and the pH conditions for improving the quality of gypsum cannot be satisfied simultaneously.

Hence, it is necessary to develop a wet desulfurization apparatus capable of improving both desulfurization efficiency and the quality of gypsum that is produced.

SUMMARY OF THE DISCLOSURE

Accordingly, the present invention has been made keeping in mind the problems encountered in the related art, and the present invention is intended to provide a wet desulfurization apparatus capable of improving both desulfurization efficiency and the quality of gypsum that is produced, and to provide a wet desulfurization method using the apparatus.

According to the present invention, the inside of the desulfurization apparatus is partitioned into two regions by means of a barrier, and desulfurization is carried out using alkaline slurries having different pH values, thereby improving desulfurization efficiency and the quality of gypsum that is produced.

Specifically, when a slurry spray part (a spray pipe) is provided in the form of a multi-tiered structure, the amount of slurry that is transferred to the spray pipe of each layer can be varied, thereby improving desulfurization efficiency.

Here, the effects of the present invention are not limited to those described above, and other effects not mentioned herein will be clearly understood by those skilled in the art from the description of the specific embodiments for carrying out the present invention.

According to an aspect of the present invention, a wet desulfurization apparatus may include a chamber enclosing a space for passing flue gas and including a first barrier partitioning the space into first and second chamber regions, a flue gas inlet configured to introduce raw flue gas into the first chamber region, and a flue gas outlet configured to discharge desulfurized flue gas from the second chamber region; a slurry reservoir including a second barrier partitioning the slurry reservoir into a first reservoir part configured to receive and store an alkaline slurry of a first pH value and a second reservoir part configured to receive and store an alkaline slurry of a second pH value; a first sprayer disposed in the first chamber region and configured to receive the alkaline slurry stored in the first reservoir part and to spray the received alkaline slurry into the first chamber region in order to remove sulfur (S) from the flue gas in the first chamber region; a second sprayer disposed in the second chamber region and configured to receive the alkaline slurry stored in the second reservoir part and to spray the received alkaline slurry into the second chamber region in order to remove sulfur (S) from the flue gas in the second chamber region; and a demister disposed in the second chamber region between the second sprayer and the flue gas outlet and configured to remove mist from the flue gas in the second chamber region.

The second pH value may be higher than the first pH value. In particular, the first pH value may fall in a range of 4.5 to 5.0, and the second pH value may fall in a range of 5.5 to 6.0.

The flue gas in the first chamber region may form a descending air current that passes through an opening between the first and second barriers to form an ascending air current in the second chamber region. To this end, the first chamber region may be disposed over the first reservoir part, and the second chamber region may be disposed over the second reservoir part.

The wet desulfurization apparatus may further include a first slurry supply pipe for supplying the first reservoir part with alkaline slurry; and a second slurry supply pipe for supplying the second reservoir part with alkaline slurry.

The wet desulfurization apparatus may further include a first oxygen gas supply pipe for supplying the first reservoir part with oxygen gas; and a second oxygen gas supply pipe for supplying the second reservoir part with oxygen gas.

The first sprayer may include a first spray pipe communicating with the first reservoir part; and multiple spray nozzles disposed along the first spray pipe to spray the alkaline slurry of the first reservoir part. Here, the first sprayer may consist of a plurality of sprayers (pipes) respectively communicating with the second reservoir part and forming a multi-tiered structure arranged vertically in the first chamber region along a flow direction of the flue gas in the first chamber region.

The second sprayer may include a second spray pipe communicating with the second reservoir part; and multiple spray nozzles disposed along the second spray pipe to spray the alkaline slurry of the second reservoir part. Here, the second sprayer may consist of a plurality of sprayers (pipes) respectively communicating with the second reservoir part and forming a multi-tiered structure arranged vertically in the second chamber region along a flow direction of the flue gas in the second chamber region.

The demister may include an upper support frame fixed to an inner wall of the chamber; a lower support frame fixed to the inner wall of the chamber; and a plurality of corrugated plates spaced apart from each other, each corrugated plate having an upper end joined to the upper support frame and a lower end joined to the lower support frame. Each of the corrugated plates may include a crest plate extending vertically and protruding in a first direction; a valley plate extending vertically and protruding in a second direction opposite to the first direction; a plate fastener extending vertically to fasten the upper end of the corrugated plate to the upper support frame and to fasten the lower end of the corrugated plate to the lower support frame; and a plurality of coupling plates extending obliquely to couple the plate fastener to each of the crest plate and the valley plate and to couple the crest plate and the valley plate to each other. The demister may further include a demisting pipe communicating with the second reservoir part; and multiple spray nozzles disposed along the demisting pipe to spray the alkaline slurry of the second reservoir part downward onto the demister in order to remove mist attached to the upper support frame, the lower support frame, and the corrugated plates.

The wet desulfurization apparatus may further include a slurry transfer controller for controlling an amount of the alkaline slurry being transferred from the slurry reservoir to at least one of the first sprayer, the second sprayer, and the demister. Here, the second sprayer may include a second spray pipe communicating with the second reservoir part; and multiple spray nozzles disposed along the second spray pipe to spray the alkaline slurry of the second reservoir part, and the second sprayer may consist of a plurality of sprayers forming a multi-tiered structure arranged vertically in the second chamber region along a flow direction of the flue gas in the second chamber region, and each second spray pipe of the second sprayer may communicate with the second reservoir part separately.

The slurry transfer controller may be configured to control the amount of the alkaline slurry being transferred from the slurry reservoir to each sprayer of the plurality of sprayers, such that a higher-positioned sprayer of the multi-tiered structure receives more alkaline slurry than a lower-positioned sprayer of the multi-tiered structure.

The demister may further include a demisting pipe communicating with the second reservoir part; and multiple spray nozzles disposed along the demisting pipe to spray the alkaline slurry of the second reservoir part downward onto the demister in order to remove mist attached to the upper support frame, the lower support frame, and the corrugated plates and in order to remove sulfur from the flue gas in the second chamber region. Here, the slurry transfer controller may be further configured to control the amount of the alkaline slurry being transferred from the slurry reservoir to the demisting pipe, by intermittently supplying alkaline slurry to remove mist attached to the upper support frame.

According to another aspect of the present invention, there is provided a method for removing sulfur (S) from flue gas using a wet desulfurization apparatus comprising a chamber enclosing a space for passing the flue gas and including a first barrier partitioning the space into first and second chamber regions; a slurry reservoir including a second barrier partitioning the slurry reservoir into a first reservoir part configured to receive and store an alkaline slurry of a first pH value and a second reservoir part configured to receive and store an alkaline slurry of a second pH value. The method may include introducing raw flue gas to the first chamber region to form a descending air current of the flue gas in the first chamber region and to form an ascending air current of the flue gas in the second chamber region that is introduced via the first chamber region; first spraying the alkaline slurry stored in the first reservoir part into the flue gas in the first chamber region, to remove sulfur from the flue gas forming the descending air current; second spraying the alkaline slurry stored in the second reservoir part into the flue gas in the second chamber region, to remove sulfur from the flue gas forming the ascending air current; and removing mist from the flue gas that has undergone the second spraying.

The wet desulfurization apparatus of the method may further include a plurality of sprayers respectively communicating with the second reservoir part and forming a multi-tiered structure arranged vertically in the second chamber region along a flow direction of the flue gas in the second chamber region, each sprayer configured to receive the alkaline slurry stored in the second reservoir part and to spray the received alkaline slurry into the second chamber region in order to remove sulfur (S) from the flue gas in the second chamber region. Thus, the method may further include controlling an amount of the alkaline slurry being transferred from the slurry second reservoir part to each sprayer such that a higher-positioned sprayer of the multi-tiered structure receives more alkaline slurry than a lower-positioned sprayer of the multi-tiered structure.

DETAILED DESCRIPTION OF THE DISCLOSURE

Figure 1:
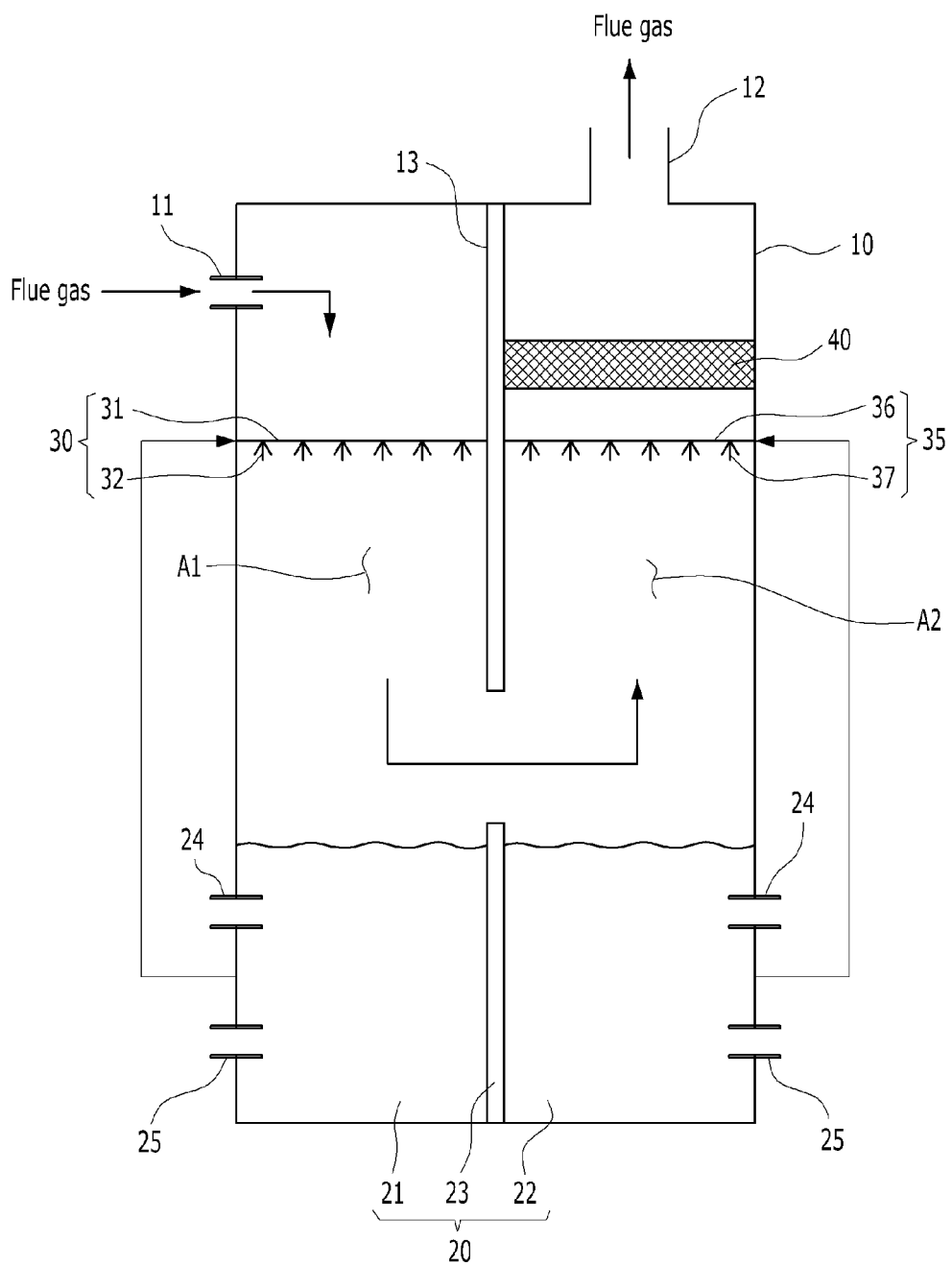
FIG. 1 is a schematic cross-section of a wet desulfurization apparatus according to an embodiment of the present invention.

Hereinafter, a detailed description will be given of the present invention with reference to the embodiments of the present invention and the drawings. These embodiments are merely set forth to illustrate the present invention but are not to be construed as limiting the scope of the present invention, as will be apparent to those skilled in the art.

Unless otherwise defined, all terms including technical and scientific terms used herein have the same meanings as those commonly understood by one of ordinary skill in the art to which the present invention belongs. In the case where the meanings thereof conflict, the description including the definitions herein shall prevail.

In order to clearly illustrate the invention proposed in the drawings, parts not related to the description are omitted, and similar parts are denoted by similar reference numerals throughout the specification. It is also to be understood that when any part is referred to as "comprising" or "including" any element, it does not exclude other elements, but may further include other elements unless otherwise stated. As used herein, the term "part" refers to a "unit" or "block" responsible for a specific function.

The ordinals ("first", "second", etc.) in individual steps are used for the sake of description and do not explain the order of the steps. Individual steps may be performed differently from the described order unless the specific order is explicitly stated in context. That is, the individual steps may be performed in the described order or in the reverse order, or may be substantially simultaneously conducted.

With reference to FIG. 1, illustrating a wet desulfurization apparatus according to an embodiment of the present invention, the apparatus comprises a chamber 10 enclosing an inner space and including a first barrier 13 for partitioning the inner space into a first chamber region A1 and a second chamber region A2, the chamber 10 further including a flue gas inlet 11 disposed at the side of the first chamber region A1 and configured to introduce flue gas containing sulfur (S), and a flue gas outlet 12 disposed at the top of the second chamber region A2 and configured to discharge flue gas containing no sulfur (S); a slurry reservoir 20 configured to include a first reservoir part 21 and a second reservoir part 22 partitioned by a second barrier 23 and to receive and store an alkaline slurry; a first sprayer 30 disposed in the first chamber region A1 and configured to receive the alkaline slurry stored in the first reservoir part 21 so as to spray the alkaline slurry into the flue gas; a second sprayer 35 disposed in the second chamber region A2 and configured to receive the alkaline slurry stored in the second reservoir part 22 so as to spray the alkaline slurry into the flue gas; and a demister 40 disposed at the upper end of the second chamber region A2 and configured to remove mist from flue gas containing no sulfur (S) obtained through the second sprayer 35, in which the flue gas containing sulfur is introduced to the flue gas inlet 11, desulfurized by sequentially passing through the first chamber region A1 and the second chamber region A2 and then discharged from the flue gas outlet 12.

In the present invention, the inside of the wet desulfurization apparatus is partitioned into two regions using the barriers 13, 23, and desulfurization is carried out using alkaline slurries having different pH values in the two regions, thereby improving desulfurization efficiency and the quality of gypsum that is produced. Specifically, the flue gas containing sulfur is introduced to the inside of the desulfurization apparatus, and the slurry containing an alkaline material is sprayed to the flue gas so as to achieve gas-liquid contact, whereby the flue gas may be desulfurized and gypsum may be produced using the absorbed sulfur. Here, in order to increase desulfurization performance, an alkaline material having a high pH may be typically used. However, if the pH is too high, desulfurization efficiency may increase but the quality of gypsum that is produced using the absorbed sulfur may deteriorate. Hence, in order to increase both desulfurization efficiency and the quality of gypsum that is produced, alkaline slurries having different pH values have to be used. Accordingly, in the present invention, primary desulfurization is carried out by spraying an alkaline slurry having a relatively low pH to the first chamber region A1, and thus gypsum of good quality is produced in the first reservoir part 21 positioned under the first chamber region A1, and secondary desulfurization is carried out by spraying an alkaline slurry having a relatively high pH to the second chamber region A2, whereby desulfurization efficiency of the flue gas may be improved and high-quality gypsum may be produced.

The chamber 10 has a generally cylindrical shape, and its inner space is partitioned into the first chamber region A1 and the second chamber region A2 by the first barrier 13 provided in a vertical direction (which indicates the up-and-down direction in FIG. 1), and the chamber includes the flue gas inlet 11 disposed at the side of the first chamber region A1 and configured to introduce flue gas containing sulfur (S) and the flue gas outlet 12 disposed at the top of the second chamber region A2 and configured to discharge flue gas containing no sulfur (S). The slurry reservoir 20 for storing (receiving) a slurry containing an alkaline material is disposed under the chamber 10, and the first sprayer 30 and the second sprayer 35 are disposed in the first chamber region A1 and the second chamber region A2, respectively, to thus spray the alkaline slurry to the flue gas in order to remove sulfur from the flue gas. Furthermore, the demister 40 for removing mist from the flue gas subjected to desulfurization through the second sprayer 35 is disposed at the upper end of the second chamber region A2. Here, the first chamber region A1 may be a region on the first reservoir part 21 and the second chamber region A2 may be a region on the second reservoir part 22. The flue gas inlet 11 is formed above the first sprayer 30 and the flue gas outlet is a passage for discharging flue gas passed through the demister 40 and is formed at the top of the second chamber region A2.

The slurry reservoir 20 may receive and store a slurry containing an alkaline material, which may be referred to as an "alkaline slurry." Here, examples of the alkaline material may include, but are not limited to, limestone ($CaCO_3$), slaked lime ($Ca(OH)_2$), ammonia ($NH_3$), and sodium hydroxide (NaOH). Taking into consideration economic efficiency and productivity, limestone ($CaCO_3$) is preferably used. The slurry reservoir 20 includes the first reservoir part 21 and the second reservoir part 22, which are separated by the second barrier 23 provided in a vertical direction. The first reservoir part 21 and the second reservoir part 22 are positioned under the first chamber region A1 and the second chamber region A2, respectively, and each of them may include a slurry supply pipe 24 for supplying the alkaline slurry and an oxygen gas supply pipe 25 for supplying oxygen gas.

The first reservoir part 21 functions to transfer the alkaline slurry to the first sprayer 30, and the first sprayer 30 sprays the alkaline slurry to the flue gas in the first chamber region A1 so that desulfurization occurs, and the sprayed alkaline slurry is collected in the first reservoir part 21. These procedures are repeated, whereby the flue gas is desulfurized. Typically, in order to remove sulfur, the use of an alkaline slurry having a high pH is preferable, but if the pH is too high, the quality of the gypsum that is produced deteriorates. Since the flue gas that enters the first chamber region A1, which is initially introduced flue gas, contains a large amount of sulfur, a considerable amount of sulfur may be removed even when an alkaline slurry having a relatively low pH is sprayed.

Accordingly, the pH of the alkaline slurry of the first reservoir part 21 falls in the range of about 4.5 to 5.0, thereby enabling both desulfurization of the flue gas and production of high-quality gypsum using the supplied oxygen, etc. The first reservoir part 21 is able to circulate the alkaline slurry having relatively low pH taking into consideration the high sulfur content of the flue gas, thereby removing sulfur and producing high-quality gypsum.

The second reservoir part 22 functions to transfer the alkaline slurry to the second sprayer 35, and the second sprayer 35 sprays the alkaline slurry to the flue gas fed to the second chamber region A2 via the first chamber region A1 so that desulfurization occurs, and the sprayed alkaline slurry is collected in the second reservoir part 22. These procedures are repeated, whereby the flue gas is desulfurized. The flue gas fed to the second chamber region A2 has relatively low sulfur content because sulfur is primarily removed in the first chamber region A1, and thus it is difficult to effectively remove sulfur using the slurry having the same pH as in the first chamber region A1. Accordingly, the pH of the alkaline slurry sprayed by the second sprayer 35 has to be higher than the pH of the alkaline slurry sprayed by the first sprayer 30, and preferably falls in the range of about 5.5 to 6.0.

Figure 2:
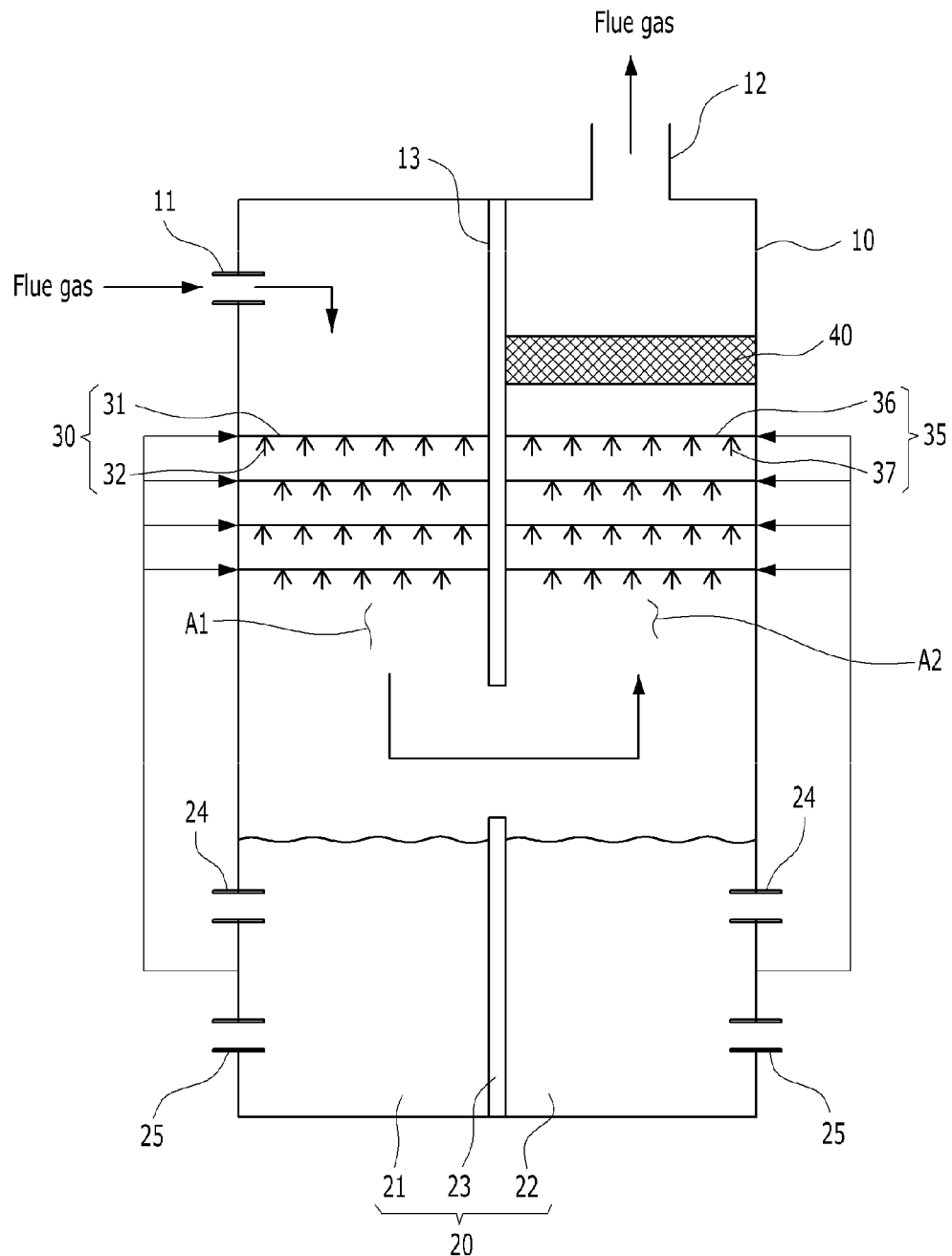
FIG. 2 is a schematic cross-section of a wet desulfurization apparatus according to an embodiment of the present invention.

The first sprayer 30 and the second sprayer 35 are disposed in the first chamber region A1 and the second chamber region A2, respectively, and may include spray pipes 31, 36 each having multiple spray nozzles 32, 37, whereby the alkaline slurry stored in the first reservoir part 21 or the second reservoir part 22 is supplied and sprayed to the flue gas, ultimately desulfurizing the flue gas. Here, in order to improve desulfurization efficiency, as shown in FIG. 2, the spray pipes 31, 36 are preferably formed in a multi-tiered structure in a vertical direction. The spray pipes are preferably provided in the form of a multi-tiered structure in order to spray a large amount of slurry, and are preferably disposed so that the spray paths of the spray nozzles 32, 37 do not overlap each other.

The demister 40 is disposed at the upper end of the second chamber region A2 of the chamber 10, thus removing mist from flue gas containing no sulfur obtained through the second sprayer 35.

Figure 3:
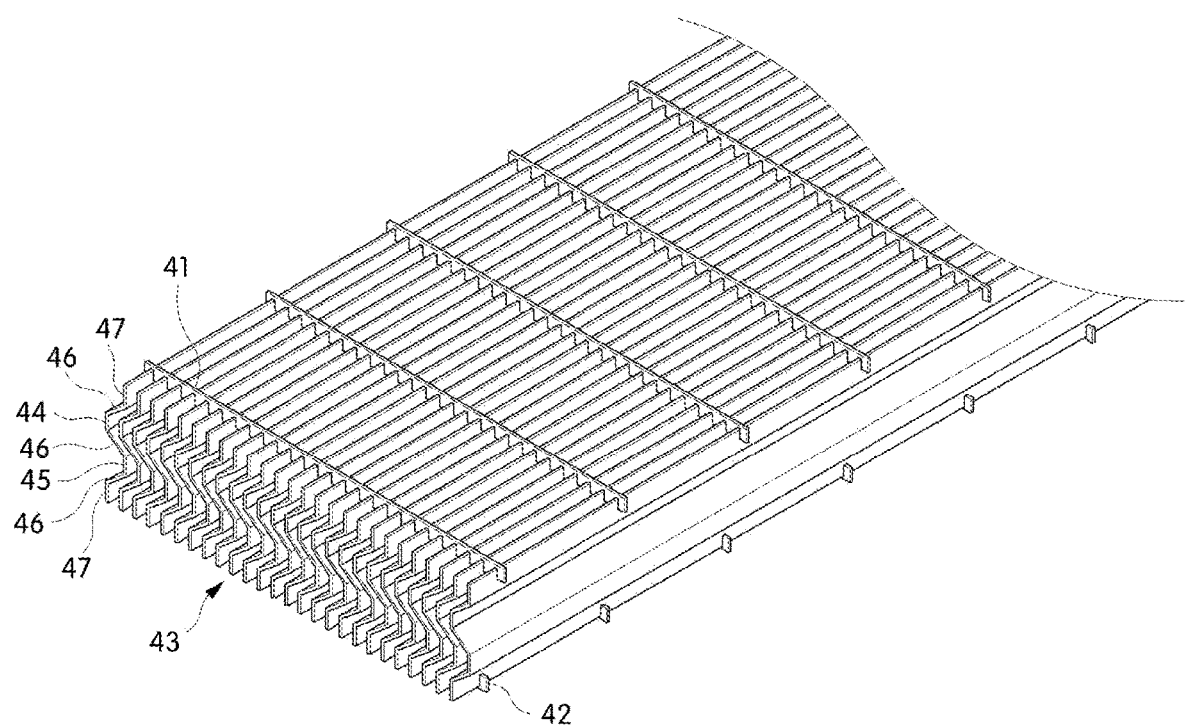
FIG. 3 is a perspective view of a demister according to an exemplary embodiment.

Referring to FIG. 3, the demister 40 according to an exemplary embodiment may include an upper support frame 41 fixed to the inner wall of the chamber 10, a lower support frame 42 fixed to the inner wall of the chamber 10, and a plurality of corrugated plates 43, joined to the upper support frame 41 and the lower support frame 42 while the corrugated plates are spaced apart from each other, and configured to have multiple S-shaped waves. Here, each of the corrugated plates 43 includes a series of ridges (crests) and grooves (valleys) formed by a crest plate 44 extending vertically and protruding in a first direction, a valley plate 45 extending vertically and protruding in the opposite direction, a plate fastener 47 extending vertically to fasten the upper end of the corrugated plate 43 to the upper support frame 41 and to fasten the lower end of the corrugated plate 43 to the lower support frame 42, and a plurality of coupling plates 46 extending obliquely to couple the plate fastener 47 to each of the crest plate 44 and the valley plate 45 and to couple the crest plate 44 and the valley plate 45 to each other. The corrugated plates 43 are configured such that the vertical plates and the tilted plates are alternately connected, whereby the flue gas is naturally guided upwards to thus efficiently pass therethrough, and the mist may be blocked so as to collide therewith or be attached thereto and may thus be removed. Specifically, the flue gas passes through the gaps between these corrugated plates 43, but the mist contained in the flue gas flows into the gaps between the corrugated plates 43 and collides with the ridges and grooves of corrugation and thus drops to the lower portion of the desulfurization apparatus, or may be attached to the corrugated plates 43, and the attached mist accumulates and flows down along the vertical planes of the vertical plates and the downward slopes of the tilted plates due to gravity, and thus drops to the lower portion of the desulfurization apparatus, thereby increasing mist removal efficiency.

Figure 4:
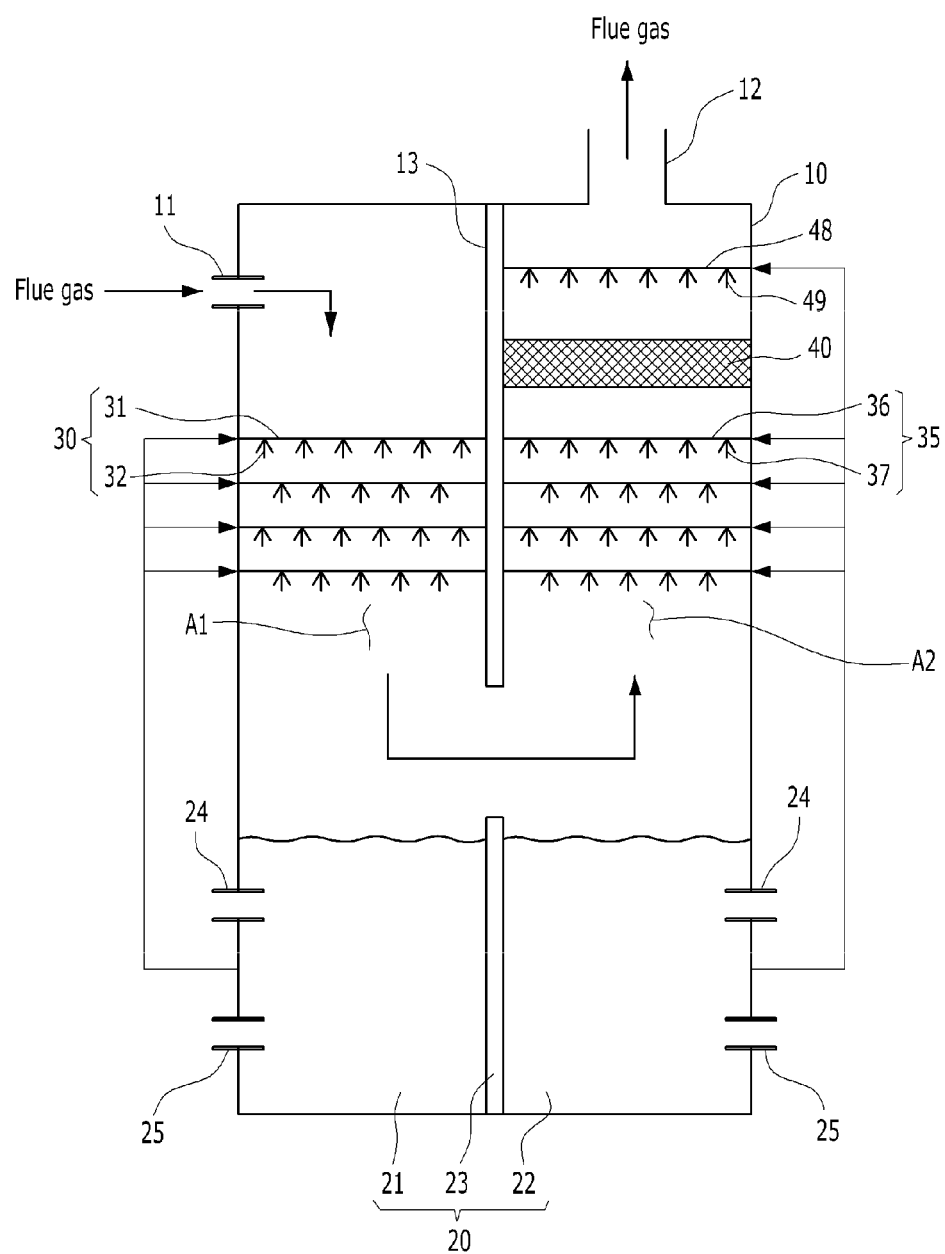
FIG. 4 is a schematic cross-section of a wet desulfurization apparatus according to an embodiment of the present invention.

Also, as shown in FIG. 4, the demister 40 may include a demisting pipe 48, which is disposed above the upper support frame 41, has multiple spray nozzles 49, and receives the alkaline slurry from the second reservoir part 22 to thus spray the alkaline slurry downwards, thus removing mist attached to the upper support frame 41, the lower support frame 42 and the corrugated plates 43. The alkaline slurry is sprayed, whereby mist attached to the corrugated plates 43 and associated structure is removed, and whereby untreated sulfur still present in the flue gas may also be removed.

Figure 5:
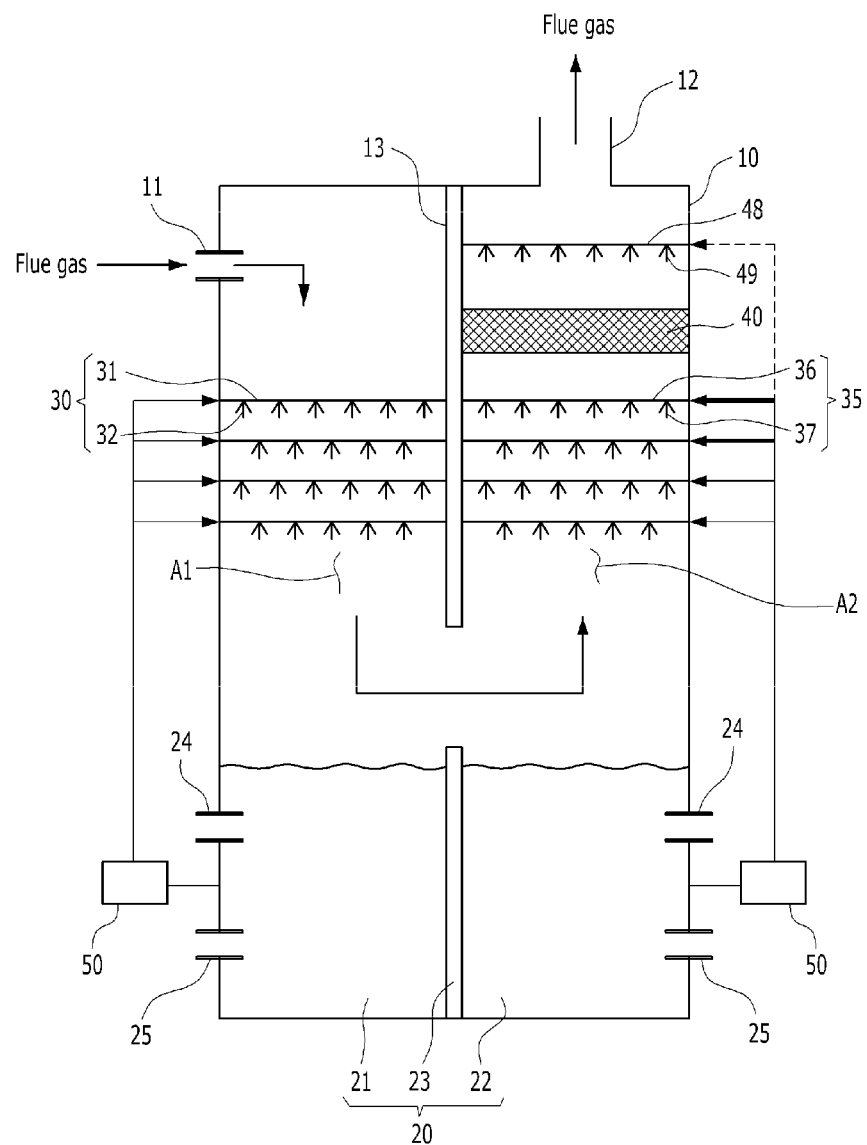
FIG. 5 is a schematic cross-section of a wet desulfurization apparatus according to an embodiment of the present invention.

In an embodiment of the present invention, as shown in FIG. 5, the wet desulfurization apparatus of the present invention may further comprise a slurry transfer controller 50 for controlling the amount of the alkaline slurry that is transferred to at least one of the first sprayer 30, the second sprayer 35 and the demister 40 from the first reservoir part 21 and the second reservoir part 22. In particular, when the spray pipes 31, 36 of the first sprayer 30 and the second sprayer 35 are formed in a multi-tiered structure and when the demister 40 includes the demisting pipe 48, the slurry transfer controller 50 is able to control the amount of the slurry that is transferred to each pipe, thereby improving desulfurization efficiency. Here, it is important to adjust the amount of the slurry that is sprayed to the second chamber region A2 where the flue gas forms an ascending air current. Although the flue gas forms a descending air current in the first chamber region A1 and may thus sufficiently come into contact with the sprayed slurry, the flue gas forms an ascending air current in the second chamber region A2 and thus desulfurization efficiency may be improved through contact between the flue gas and the slurry under the condition that the slurry is sprayed in a larger amount to the upper portion of the second chamber region, where the sulfur concentration gradually decreases. Accordingly, when the spray pipe 36 of the second sprayer 35 is formed in a multi-tiered structure, the spray pipe 36 at the lowermost position sprays the slurry to the flue gas containing relatively high sulfur content to thus supply the smallest amount of slurry (represented as the thinnest line), and the spray pipe 36 at the uppermost position sprays the slurry to the flue gas containing relatively low sulfur content to thus supply the largest amount of slurry (represented as the thickest line). Consequently, the sprayed slurry moves downwards and thus the flue gas that is positioned relatively low may come into contact with the largest amount of slurry, thus effectively improving desulfurization efficiency.

The slurry supplied through the demisting pipe 48 has a major function of removing the mist attached to the corrugated plates 43 and the like and a minor function of removing the remaining sulfur, and is thus preferably supplied in an intermittent manner (represented as a dotted line).

Next, a wet desulfurization method using the aforementioned wet desulfurization apparatus is described. Since the aforementioned wet desulfurization apparatus is used to perform the wet desulfurization method, a redundant description thereof is omitted.

According to an embodiment of the present invention, a wet desulfurization method using the aforementioned wet desulfurization apparatus comprises: (1) introducing flue gas containing sulfur (S) to a first chamber region A1 via a flue gas inlet 11; (2) supplying an alkaline slurry stored in a first reservoir part 21 to a first sprayer 30; (3) removing sulfur (S) by spraying the alkaline slurry from the first sprayer 30 to the flue gas that is introduced to the first chamber region A1 via the flue gas inlet 11 and forms a descending air current; (4) supplying an alkaline slurry stored in a second reservoir part 22 to a second sprayer 35; (5) removing sulfur (S) by spraying the alkaline slurry from the second sprayer 35 to the flue gas that is introduced to a second chamber region A2 via the first chamber region A1 and forms an ascending air current; (6) removing mist from flue gas containing no sulfur (S) using a demister 40; and (7) discharging flue gas containing neither sulfur (S) nor mist.

In the present invention, the inside of the wet desulfurization apparatus is partitioned into two regions by means of barriers 13, 23, and the flue gas is desulfurized using alkaline slurries having different pH values in the two regions, particularly by spraying the slurry having relatively low pH to the first chamber region A1 and spraying the slurry having relatively high pH to the second chamber region A2, thereby improving desulfurization efficiency and the quality of gypsum that is produced.

In step (1), the flue gas is introduced. Specifically, the flue gas containing sulfur is introduced to the first chamber region A1 of the chamber 10 via the flue gas inlet 11 and forms a descending air current.

In step (2), the alkaline slurry stored in the first reservoir part 21 is supplied to the first sprayer 30. Here, the alkaline slurry having a pH lower than that of the alkaline slurry stored in the second reservoir part 22 is supplied.

In step (3), the alkaline slurry supplied to the first sprayer 30 is sprayed to the flue gas that forms a descending air current, whereby the flue gas is subjected to desulfurization. In order to improve desulfurization efficiency, the first sprayer 30 sprays the alkaline slurry supplied from the first reservoir part 21 using a spray pipe 31 having multiple spray nozzles 32, and the spray pipe 31 is preferably formed in a multi-tiered structure in the vertical direction of the chamber 10.

In step (4), the alkaline slurry stored in the second reservoir part 22 is supplied to the second sprayer 35. Here, the alkaline slurry having a pH higher than that of the alkaline slurry stored in the first reservoir part 21 is supplied.

In step (5), the alkaline slurry supplied to the second sprayer 35 is sprayed to the flue gas that forms an ascending air current, thus subjecting the flue gas to desulfurization. In order to improve desulfurization efficiency, the second sprayer 35 sprays the alkaline slurry supplied from the second reservoir part 22 using a spray pipe 36 having multiple spray nozzles 37, and the spray pipe 36 is preferably formed in a multi-tiered structure in the vertical direction of the chamber 10. Moreover, in order to further improve desulfurization efficiency, it is preferred that control be performed so that the largest amount of slurry is transferred to the spray pipe 36 at the uppermost position and the smallest amount of slurry is transferred to the spray pipe 36 at the lowermost position. Briefly, a small amount of slurry is sprayed to the flue gas having relatively high sulfur content and a large amount of slurry is sprayed to the flue gas having relatively low sulfur content, thereby improving desulfurization efficiency.

In step (6), the mist is removed from the flue gas containing no sulfur using the demister 40. An upper support frame 41, a lower support frame 42, and corrugated plates 43 are disposed to thus induce physical collisions with the flue gas, after which the mist is attached to the corrugated plates 43 and the like, thereby removing the mist from the flue gas.

In step (7), the flue gas, the desulfurization of which is completed, is discharged, and the discharged flue gas may be transported to a subsequent treatment facility such as an electrostatic precipitator or similar equipment.

In this specification, only a few examples of various embodiments performed by the present inventors are described, but the technical idea of the present invention is not limited thereto, and may be variously modified by those skilled in the art.

What is claimed is:

1. A wet desulfurization apparatus, comprising:
   a chamber enclosing a space for passing flue gas and including a first barrier partitioning the space into first and second chamber regions, a flue gas inlet configured to introduce raw flue gas into the first chamber region, and a flue gas outlet configured to discharge desulfurized flue gas from the second chamber region;
   a slurry reservoir including a second barrier partitioning the slurry reservoir into a first reservoir part configured to receive and store an alkaline slurry of a first pH value and a second reservoir part configured to receive and store an alkaline slurry of a second pH value;
   a first sprayer disposed in the first chamber region and configured to receive the alkaline slurry stored in the first reservoir part and to spray the received alkaline slurry into the first chamber region in order to remove sulfur (S) from the flue gas in the first chamber region;
   a second sprayer disposed in the second chamber region and configured to receive the alkaline slurry stored in the second reservoir part and to spray the received alkaline slurry into the second chamber region in order to remove sulfur (S) from the flue gas in the second chamber region; and
   a demister disposed in the second chamber region between the second sprayer and the flue gas outlet and configured to remove mist from the flue gas in the second chamber region.

2. The wet desulfurization apparatus of claim 1, wherein the second pH value is higher than the first pH value.

3. The wet desulfurization apparatus of claim 1, wherein the first pH value falls in a range of 4.5 to 5.0, and the second pH value falls in a range of 5.5 to 6.0.

4. The wet desulfurization apparatus of claim 1, wherein the flue gas in the first chamber region forms a descending air current that passes through an opening between the first and second barriers to form an ascending air current in the second chamber region.

5. The wet desulfurization apparatus of claim 1, wherein the first chamber region is disposed over the first reservoir part, and the second chamber region is disposed over the second reservoir part.

6. The wet desulfurization apparatus of claim 1, further comprising:
a first slurry supply pipe for supplying the first reservoir part with alkaline slurry; and
a second slurry supply pipe for supplying the second reservoir part with alkaline slurry.

7. The wet desulfurization apparatus of claim 1, further comprising:
a first oxygen gas supply pipe for supplying the first reservoir part with oxygen gas; and
a second oxygen gas supply pipe for supplying the second reservoir part with oxygen gas.

8. The wet desulfurization apparatus of claim 1, wherein the first sprayer comprises:
a first spray pipe communicating with the first reservoir part; and
multiple spray nozzles disposed along the first spray pipe to spray the alkaline slurry of the first reservoir part.

9. The wet desulfurization apparatus of claim 1, wherein the first sprayer consists of a plurality of sprayers respectively communicating with the second reservoir part and forming a multi-tiered structure arranged vertically in the first chamber region along a flow direction of the flue gas in the first chamber region.

10. The wet desulfurization apparatus of claim 1, wherein the second sprayer comprises:
a second spray pipe communicating with the second reservoir part; and
multiple spray nozzles disposed along the second spray pipe to spray the alkaline slurry of the second reservoir part.

11. The wet desulfurization apparatus of claim 1, wherein the second sprayer consists of a plurality of sprayers respectively communicating with the second reservoir part and forming a multi-tiered structure arranged vertically in the second chamber region along a flow direction of the flue gas in the second chamber region.

12. The wet desulfurization apparatus of claim 1, wherein the demister comprises:
an upper support frame fixed to an inner wall of the chamber;
a lower support frame fixed to the inner wall of the chamber; and
a plurality of corrugated plates spaced apart from each other, each corrugated plate having an upper end joined to the upper support frame and a lower end joined to the lower support frame.

13. The wet desulfurization apparatus of claim 12, wherein each of the corrugated plates comprises:
a crest plate extending vertically and protruding in a first direction;
a valley plate extending vertically and protruding in a second direction opposite to the first direction;
a plate fastener extending vertically to fasten the upper end of the corrugated plate to the upper support frame and to fasten the lower end of the corrugated plate to the lower support frame; and
a plurality of coupling plates extending obliquely to couple the plate fastener to each of the crest plate and the valley plate and to couple the crest plate and the valley plate to each other.

14. The wet desulfurization apparatus of claim 12, wherein the demister further comprises:
a demisting pipe communicating with the second reservoir part; and
multiple spray nozzles disposed along the demisting pipe to spray the alkaline slurry of the second reservoir part downward onto the demister in order to remove mist attached to the upper support frame, the lower support frame, and the corrugated plates.

15. The wet desulfurization apparatus of claim 1, further comprising a slurry transfer controller for controlling an amount of the alkaline slurry being transferred from the slurry reservoir to at least one of the first sprayer, the second sprayer, and the demister.

16. The wet desulfurization apparatus of claim 15, wherein the second sprayer comprises:
a second spray pipe communicating with the second reservoir part; and
multiple spray nozzles disposed along the second spray pipe to spray the alkaline slurry of the second reservoir part,
wherein the second sprayer consists of a plurality of sprayers forming a multi-tiered structure arranged vertically in the second chamber region along a flow direction of the flue gas in the second chamber region, and each second spray pipe of the second sprayer communicates with the second reservoir part separately.

17. The wet desulfurization apparatus of claim 16, wherein the slurry transfer controller is configured to control the amount of the alkaline slurry being transferred from the slurry reservoir to each sprayer of the plurality of sprayers, such that a higher-positioned sprayer of the multi-tiered structure receives more alkaline slurry than a lower-positioned sprayer of the multi-tiered structure.

18. The wet desulfurization apparatus of claim 17, wherein the demister further comprises:
a demisting pipe communicating with the second reservoir part; and
multiple spray nozzles disposed along the demisting pipe to spray the alkaline slurry of the second reservoir part downward onto the demister in order to remove mist attached to the upper support frame, the lower support frame, and the corrugated plates and in order to remove sulfur from the flue gas in the second chamber region, and
wherein the slurry transfer controller is further configured to control the amount of the alkaline slurry being transferred from the slurry reservoir to the demisting pipe, by intermittently supplying alkaline slurry to remove mist attached to the upper support frame.

19. A method for removing sulfur (S) from flue gas using a wet desulfurization apparatus comprising a chamber enclosing a space for passing the flue gas and including a first barrier partitioning the space into first and second chamber regions; a slurry reservoir including a second barrier partitioning the slurry reservoir into a first reservoir part configured to receive and store an alkaline slurry of a first pH value and a second reservoir part configured to receive and store an alkaline slurry of a second pH value, the method comprising:
introducing raw flue gas to the first chamber region to form a descending air current of the flue gas in the first chamber region and to form an ascending air current of the flue gas in the second chamber region that is introduced via the first chamber region;

first spraying the alkaline slurry stored in the first reservoir part into the flue gas in the first chamber region, to remove sulfur from the flue gas forming the descending air current;

second spraying the alkaline slurry stored in the second reservoir part into the flue gas in the second chamber region, to remove sulfur from the flue gas forming the ascending air current; and removing mist from the flue gas that has undergone the second spraying.

20. The method of claim 19, wherein the wet desulfurization apparatus further comprises a plurality of sprayers respectively communicating with the second reservoir part and forming a multi-tiered structure arranged vertically in the second chamber region along a flow direction of the flue gas in the second chamber region, each sprayer configured to receive the alkaline slurry stored in the second reservoir part and to spray the received alkaline slurry into the second chamber region in order to remove sulfur (S) from the flue gas in the second chamber region, the method further comprising:

controlling an amount of the alkaline slurry being transferred from the slurry second reservoir part to each sprayer such that a higher-positioned sprayer of the multi-tiered structure receives more alkaline slurry than a lower-positioned sprayer of the multi-tiered structure.

* * * * *